(12) United States Patent
Allamaraju

(10) Patent No.: US 8,001,216 B2
(45) Date of Patent: Aug. 16, 2011

(54) SYSTEM AND METHOD FOR A WEB SERVICE PORTLET REGISTRY

(75) Inventor: Subrahmanyam Allamaraju, Longmont, CO (US)

(73) Assignee: Oracle International Corporation, Redwood Shores, CA (US)

( * ) Notice: Subject to any disclaimer, the term of this patent is extended or adjusted under 35 U.S.C. 154(b) by 965 days.

(21) Appl. No.: 11/172,253

(22) Filed: Jun. 30, 2005

(65) Prior Publication Data
US 2007/0005733 A1 Jan. 4, 2007

(51) Int. Cl.
*G06F 15/16* (2006.01)
*G06F 15/173* (2006.01)
*G06F 9/46* (2006.01)

(52) U.S. Cl. ........ 709/219; 709/217; 709/226; 709/227; 709/231; 718/101

(58) Field of Classification Search ................... 709/217, 709/227, 226, 231, 219; 718/101
See application file for complete search history.

(56) References Cited

U.S. PATENT DOCUMENTS

| | | | |
|---|---|---|---|
| 6,507,867 B1 | 1/2003 | Holland et al. | |
| 6,564,251 B2 | 5/2003 | Katariya et al. | |
| 6,845,394 B2* | 1/2005 | Ritche | 709/221 |
| 7,346,923 B2 | 3/2008 | Atkins et al. | |
| 7,370,064 B2* | 5/2008 | Yousefi'zadeh | 1/1 |
| 7,502,833 B2* | 3/2009 | Schaeck | 709/217 |
| 2002/0169852 A1 | 11/2002 | Schaeck | |
| 2003/0167315 A1* | 9/2003 | Chowdhry et al. | 709/218 |
| 2004/0054749 A1* | 3/2004 | Doyle et al. | 709/217 |
| 2005/0080768 A1 | 4/2005 | Zhang et al. | |
| 2006/0004913 A1* | 1/2006 | Chong | 709/217 |
| 2006/0004923 A1* | 1/2006 | Cohen et al. | 709/228 |
| 2006/0031377 A1* | 2/2006 | Ng et al. | 709/208 |
| 2006/0235935 A1 | 10/2006 | Ng | |

OTHER PUBLICATIONS

Christopher Negus and Thomas Weeks, Linux Troubleshooting Bible, 2004, Wiley Publishing, Inc. pp. 40 and 42.*
SmartComputing, Nov. 2002, [online], [retrieved on Nov. 7, 2008]. Retrieved from www.smartcomputing.com/editorial/article. asp?article=articles%2F2002%2Fs1311%2F59s11web%2Fs59s11web.asp, pp. 1-4.
Schaeck, T., Web Services for Remote Portals (WSRP) Whitepaper, Sep. 22, 2002, pp. 1-18.
Bos, CSS Tutorial, Apr. m, 2004, retrieved form the internet ,<web.archive.org/web/*/http://w3.org/Style/Examples/011/ firstcss.en.html>, pp. 1-12 as printed.
Web Services for Remote Portlets Specification, Version 1.0, Organization for the Advancement of Structured Information Standards (OASIS), Sep. 3, 2003, 86 pages.

* cited by examiner

*Primary Examiner* — William Vaughn, Jr.
*Assistant Examiner* — Farrukh Hussain
(74) *Attorney, Agent, or Firm* — Fliesler Meyer LLP

(57) ABSTRACT

A portlet registry enables organization and implementation of portlets for a producer system. A producer system makes one or more portlets accessible for utilization by remote consumers. A portlet registry is generated that enables searching and accessing portlets across a wide variety of producer systems. Each producer generates a registry of portlets that are accessible and can publish the registry as a web service. The registry is made accessible via protocols that allow it to be accessed by remote consumers. A remote consumer can then search across multiple producers by utilizing the registry. This enables the consumers find producers and portlets based on search criteria.

16 Claims, 8 Drawing Sheets

SYSTEM AND METHOD FOR A WEB SERVICE PORTLET REGISTRY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/169,557 entitled ENTITLEMENT DESIGNATION IN WEB SERVICES FOR REMOTE PORTLETS ENVIRONMENT, by Subbu Allamaraju et al., filed on Jun. 29, 2005, U.S. patent application Ser. No. 11/172,253, entitled SYSTEM AND METHOD FOR A WEB SERVICE PORTLET REGISTRY, by Subbu Allamaraju, filed on Jun. 30, 2005, U.S. patent application Ser. No. 11/170,884 entitled SYSTEM AND METHOD FOR PUBLISHING TO A WEB SERVICE PORTLET REGISTRY, by Subbu Allamaraju, filed on Jun. 30, 2005, and U.S. patent application Ser. No. 11/170,053 entitled SYSTEM AND METHOD FOR DELIVERING GROUPED WEB SERVICE APPLICATIONS, by Subbu Allamaraju et al., filed on Jun. 29, 2005.

INCORPORATION BY REFERENCE

The present invention incorporates by reference in its entirety the Web Services for Remote Portlets standard version 1.0, by the OASIS Group, published on Sep. 22, 2002.

FIELD OF THE INVENTION

The present invention relates broadly to the delivery of web portal content. The present invention relates more particularly to systems, methods, and computer readable media for providing a web service portlet registry.

BACKGROUND OF THE INVENTION

Conventionally, web portals, which provide access to a variety of applications and content through a single location, have become an increasingly popular means for delivering applications and information. Whereas previously, web portals were used to deliver a relatively limited amount of functionality, they have become an increasingly popular means for delivering functional applications to local and global communities.

While many custom applications have been developed for use with web portals, an ongoing concern has been the need to develop an applications infrastructure for supporting more complex applications. Various mechanisms have been proposed to address this issue. The Web Services for Remote Portlets (WSRP) standard from the Oasis Group establishes a framework whereby applications can be presented on a page without the need for a support apparatus for the application on the server delivering the page.

However, conventional implementations of WSRP are limited in their ability to perform authentication or otherwise control access to portlets. For example, current approaches allow a system to access a portlet, but are quite limited in their capabilities to provide access to multiple portlets provided by various producers.

What is needed are improved techniques for organizing remote portlets.

DETAILED DESCRIPTION

Figure 1:
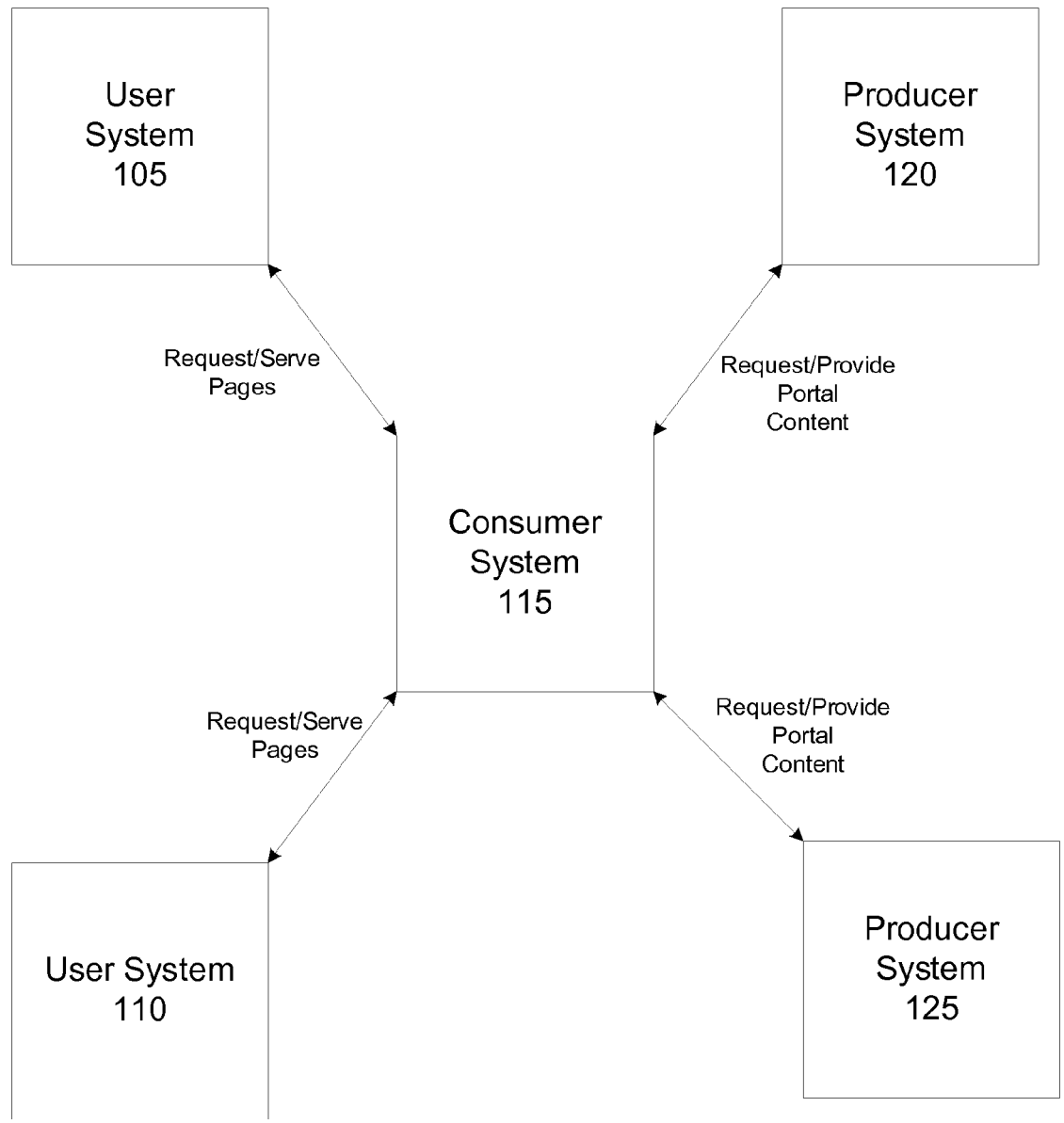
FIG. 1 is a block diagram illustrating an overview of the interaction between a consumer system, user systems, and producer systems in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The present application discloses mechanisms and methods for registering available portlets with a portlet registry. Maintaining a portlet registry enables better organization and implementation of portlets from more than one portal to be maintained using the registry. Applications and/or users seeking to access a portlet can search in the registry for the portlet substantially independent of which web portal the application and/or user is associated with. The portlets may reside on a producer system. As used herein, the term "producer" refers to a system that makes one or more portlets accessible for utilization by remote consumers. Portlets are applications that can be presented on a consumer page while residing on the producer. As used herein, the term "consumer" refers to a system that is configured to present applications that are located externally. A consumer typically offers one or more pages on an internal web portal that can be used to present remote applications. A consumer system utilizes applications that are stored on a remote producer system.

In an embodiment, a portlet registry is generated that enables searching and accessing portlets across a wide variety of producer systems. Each producer generates a registry of portlets that are accessible and can publish the registry as a web service. The registry is made accessible via protocols that allow it to be accessed by remote consumers. A remote consumer can then search across multiple producers by utilizing the registry. This enables the consumers find producers and portlets based on search criteria.

In an embodiment, a method for publishing to a registry of portlets is provided. The method embodiment includes receiving publication information indicating a change to at least one portlet in a plurality of portlets. In an embodiment, the publication information includes a web service identifier that identifies the at least one portlet having a change in availability and a web service identifier that associates the portlet with a producer system. Periodically, a set of portlets is processed. The set of portlets includes the at least one portlet as a batch. A determination is made whether the processing of the set of portlets in the batch was successful. Publication information that was not successfully processed is stored locally for processing during processing of a subsequent set of portlets.

FIG. 1 illustrates an overview of the interaction between a consumer system, user systems, and producer systems in an embodiment. Producer systems 120, 125 can store one or more portlet applications that are utilized by user systems 105, 110 through a consumer system 115. In some embodiments, the producer systems can maintain web portals. In alternate embodiments, the producer systems perform other functions or merely serve to provide access to portlets. The user systems 105, 110 are systems remote to the consumer 115 that are utilized by end users and include web page viewing capabilities.

The consumer 115 is a network accessible system that serves web pages, content, and applications to other parties. The consumer 115 can serve its own content in addition to content stored on the producers 120, 125. The consumer 115 presents a web interface to the user systems 105, 110 that utilizes applications stored both locally and on the producers 120, 125. The consumer serves pages that utilize remote portlets on the producers through proxy portlets and allow the consumer to utilize the remote portlets' functionality. The proxy portlets are references to remote portlets that are stored within the web pages on the consumer that cause the portlets to appear within the consumer web pages.

During a registration phase, the consumer 115 registers with a producer 120. In one embodiment, the producer 120 identifies each consumer with a unique handle that enables the producer 120 to identify what portlets are available to a particular consumer. In alternative embodiments, the consumer does not register with the producer 120. The producer can provide a service description to the consumer 115 that indicates properties of the producer 120 and lists the available portlets that are stored on the producer 120. During a description phase, the producer 120 also provides a Web Services Description Language (WSDL) file indicating data types and message protocols to be used for interacting with the producer 120. This process is described in greater detail with respect to FIG. 2.

When a user system 105 establishes contact with the consumer 115, the consumer 115 aggregates pages, and stores proxy portlets in the pages that access remote portlets on the producer 120. The user system 105 can send a page request to the consumer 115 for a page that includes remote portlets that utilize the producer. When such a request is received by the consumer 115 from the user system 105, the consumer 115 sends a request for the data that appears in the page to the producer 120. The producer 120 returns the data, which the consumer 115 integrates into a single user interface and presents to the end user system 105.

Figure 2:
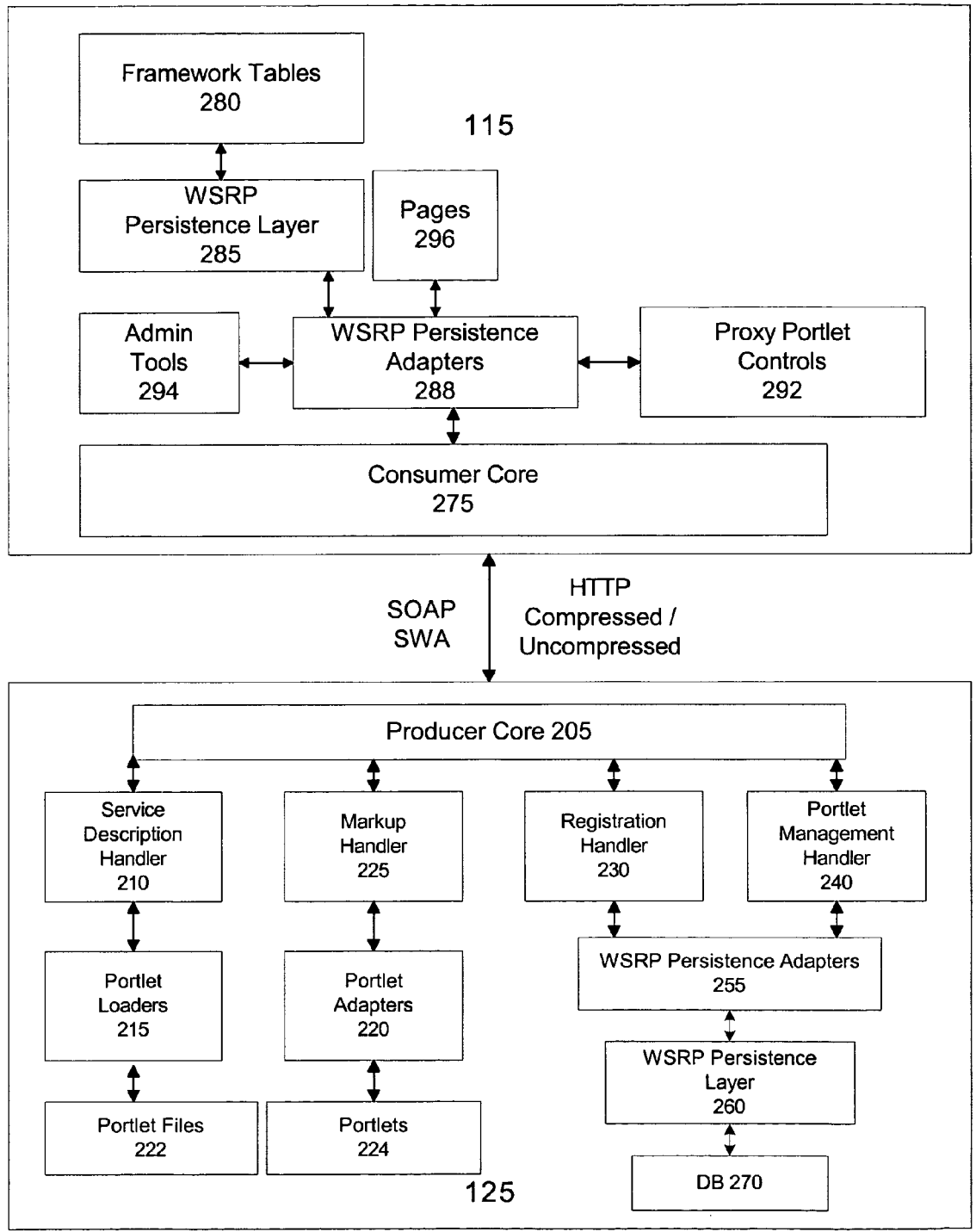
FIG. 2 is a block diagram illustrating another high-level view of a consumer and a producer in an embodiment.

FIG. 2 is a block diagram illustrating a more detailed view of a consumer 115 and a producer 125 in an embodiment. The producer 125 includes a producer core 205, a service description handler 210, portlet loaders 215, portlet adapters 220, portlet files 222, a markup handler 225, a registration handler 230, a portlet management handler 240, WSRP persistence adapters 255, persistence layers 260, one or more portlets 224, a server module and a database (DB) 270.

The producer core 205 is an application such as a servlet that is configured to reside on the producer 125 and communicates with the consumer 115. The producer core 205 generates the WSDL files that indicate the parameters of communication between the producer 125 and the consumer 115 and transmits a file to the consumer 115 or otherwise provides the parameters to the consumer 115. These parameters can include data types and messaging protocols and can be preconfigured or user-selected. The producer 205 additionally includes a service description handler 210. The service description handler 210 is responsible for providing a listing of portlets 224 that are available to consumers.

The service description handler utilizes the portlet loaders 215 to load the portlet files 222. The portlet files 222, which define the available portlets, are either portlet files or files created from a deployment descriptor such as a portlet.xml file. In some embodiments, the portlet loaders 215 include separate loaders for different types of portlets such as Java™ Page Flow (JPF) portlets, Struts portlets, Java Speciation Request (JSR) 168 base portlets, and Java portlets. (Java™ is a trademark of Sun Microsystems, Inc.) Struts portlets are portlets that utilize the Struts framework layer from the Apache Software Foundation. JPF portlets are portlets that utilize Page Flows to separate interface content from navigation control and other functional logic. In some embodiments, the JPF portlets on the producer can support nested page flows. Nested page flows are page flows that can be utilized temporarily without discarding a currently executing page flow. While the above portlets types are used as examples throughout this application, it should be understood that any portlet type can be supported.

The service description handler 210, through the producer core returns to the consumer 115 a set of available portlets in the form of an array of PortletDefinition classes or some other format. The PortletDefinition classes include a portletHandle identifier that identifies the portlet and modes, states, MIME types, a title, and a description for each portlet. Other information can also be provided.

A registration handler 230 registers consumers with the producer 125 so that the consumers can access portlets on the producer 125. The registration process entails the consumer 115 providing certain identification information to the producer 125. In some embodiments, the producer does not register the consumer. The consumer registration information can be stored in the database 270 through the persistence adapters 255 and persistence layer 260.

The portlet management handler 240 is responsible for storing, modifying, and retrieving portlet preferences and modifying or deleting portlets. The WSRP persistence adapters 255 are configured to receive requests to generate, modify, and read information stored in the database 270 from the registration handler 230 and portlet management handler 240.

In one embodiment, the WSRP persistence adapters 255 include separate adapters for the registration handler 230 and the portlet management handler 240. The persistence layer 260 manages access to the database 270 by representing data in the database as objects, and allows particular data types to be accessed as such without requiring that the accessing entity have any knowledge about how said data is stored in the database. When a request to modify data, such as modifying the registration information of a consumer is received from the registration handler 230 through its persistence adapter 255, the persistence layer 260 receives the request in the form of an object modification request. The persistence layer 260 locates the various instances in the database associated with the registration information and modifies them appropriately.

The markup handler 225 is responsible for processing markup requests (requests for the visual representation of the portlets within the page) for the portlets 224. When a request from a user system is received at the consumer, for example, a page is loaded that utilizes a remote portlet, the consumer 115 requests the appropriate render data from the producer. This request includes an identity of the portlet and a listing of capabilities of the user system. The markup handler 225 receives this request and determines an appropriate portlet adapter 220 to access the referenced portlet. The portlet adapters 220 are adapters that enable portlets 224 to be accessed as remote portlets. The portlet adapters can include portlet adapters for multiple portlet types, such as JPF, Java, JSR168, and Struts portlets. In some embodiments, a portlet adapter can comprise a Java Archive (JAR) file that is inserted into a producer to enable it to interact with remote consumers in a manner similar to how the portlet would interact with a local portal.

A server module generates a user interface layer that enables a user selecting a portlet on a displayed page on a producer portal to obtain configuration information for utilizing the portlet as a remote portlet. This information can be obtained by selecting the portlet with a mouse, dragging the portlet to an email window or web browser window, or through some other means such as a voice interface or touchscreen. In some embodiments, the server module performs other portal display/management functions as well.

The consumer 115 includes a consumer core 275 that manages communication with the producer 125, one or more persistence adapters 288, administration tools 294, proxy portlet controls 292, a WSRP persistence layer 285, one or more pages 296 that reference the remote portlets 224 through included proxy portlets, a server module and framework tables 280.

The consumer core 275 communicates with the producer core 205 using the Simple Object Access Protocol (SOAP) or another suitable protocol. In some embodiments, the consumer and producer cores use a variant of SOAP, known as SOAP With Attachments (SWA) that enables binary files to be attached to SOAP messages. In some embodiments, the producer and consumer use HyperText Transport Protocol (HTTP) and may use compression to reduce the size of transmitted data. The consumer core 275 receives a WSDL file from the producer 125 that it uses to configure its interaction with the producer 125. While in the present embodiment a file is used, in alternate embodiments, the configuration information can be provided in a any one of a variety of different formats.

The framework tables 280 store information about the portlets available on the producer 125 (and other portlets) that is received from the service handler 210 of the producers. This information can include identifying information for the portlets, identifying information for the producer 125, capacities of the producer 125, and the types of functionality provided by the portlets. The framework table 280 also can include information about instances of proxy portlets stored on the consumer 115. When a portlet is first identified during registration/discovery a proxy portlet control 292 is created for the proxy that can be used to configure how the proxy is utilized on the consumer side.

A set of administration tools 294 enable a user or administrator of the consumer to create web pages 296 that access the remote portlets on the producer. The administrative tools insert a proxy portlet associated with a remote portlet on the producer into a created page 296 in a location that would normally refer to a portlet local to the consumer.

A server module generates a user interface layer that enables a user selecting a section on one of the pages 296 to receive configuration information for utilizing a portlet on the producer 125 as a remote portlet. This information can be obtained by selecting a portlet 125 on the producer with a mouse and dragging the portlet to one of the pages 296 or through some other means such as a voice interface, touchscreen interface, or custom means. In some embodiments, the server module performs other portal display/management functions as well.

A persistence layer 285 enables the admin tools and the proxy portlet controls 292 to store information about proxy portlet instances, including configuration information through their respective persistence adapters 288. This information can be retrieved, created, or modified by submitting actions to be performed on data objects to the persistence layer 285. The persistence layer 285 receives the actions, locates the data corresponding to the objects on the framework tables 280 and retrieves and/or modifies the tables accordingly.

When a user system attempts to render a page 296 on the consumer that includes one of the remote portlets 224, the consumer 115 transmits a GetMarkup request to the producer 125 to obtain the rendered content that should appear in the page. The request includes a handle for the portlet and capabilities of the client on the user system 105. The producer 125 utilizes one of the portlet adapters 220 to obtain the rendered content for the page from the portlet and returns the content to the consumer 115, which renders the page.

If a user system initiates an interaction with a page utilizing a remote portlet, for example by submitting a form, the consumer 115 sends to the producer the handle for the portlet, the form data storing the information stored on the form, query data indicating a requested response from the portlet, and any uploaded information. The producer 125 utilizes one of the portlet adapters 220 to submit this information to the portlet as if it had been submitted locally to the portlet. The portlet processes the request and changes its current mode/window state in response. The mode/window state indicates a state/mode for the window displaying the portlet, such as minimized, maximized, hidden, or normal.

The producer then returns to the consumer the new window state and a new navigational state for the portlet indicating a new page to be rendered on the main page on the consumer 115. When the consumer 115 subsequently requests markup, this new page, which presumably includes the response to the submitted form, is displayed inside the viewed portal page on the consumer.

In various embodiments, the producer system 125 utilizes templates for various types of Uniform Resource Locators (URLs). The templates include embedded fields for different types of information to be provided by the producer or consumer. When URLs are passed between the producer and the consumer, they may be rewritten by the consumer or producer to reflect differences in how the URLs would be accessed from either system. For example, URL designed to be utilized by the producer might not include the domain of the producer and would only include a location in a local file system. The consumer could rewrite such a URL with a global address that included the domain of the producer. Alternately, when the consumer submits a markup or other page request to the producer, it embeds blank fields into the URL for information such as markup state, window state, interaction state, and other information. The producer then rewrites the URL with this information included.

In some embodiments, page flow portlets and struts portlets can interact directly with a user system rather than working through the consumer. As mentioned above, the producer can utilize a URL writing framework based on templates. When portlets are interacting directly with a user, one set of templates is used. When portlets interact through a consumer a separate set of templates are used. For example, when a portlet is being accessed directly by a user, a template is used that does not require rewriting by the consumer.

Figure 3:
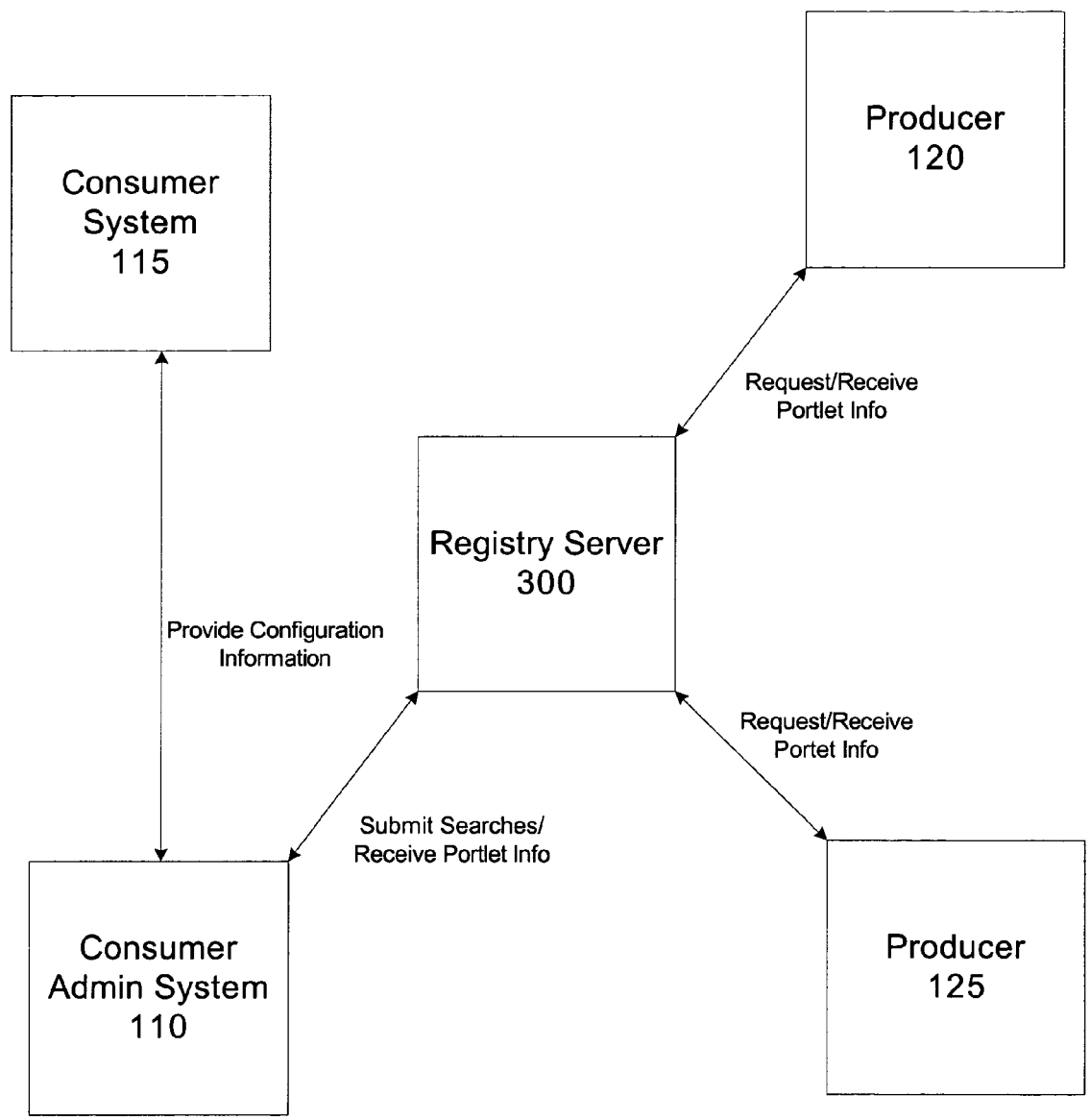
FIG. 3 illustrates an interaction among a registry server, several producer systems, and a consumer system in an embodiment.

FIG. 3 illustrates an interaction among a registry server 300, several producer systems 120, 125, a consumer administrative system 110 and a consumer system 115 in an embodiment. In the present embodiment the producers 120, 125 publish information about accessible portlets, which is provided to the registry server 300. This information is then made available to the consumer administrative system 110 that utilizes the information to configure the consumer 115.

The registry server 300 maintains a portlet registry in the form of a relational database, for example. The registry server can be a separate server or a module running on a web server. The database typically includes a series of portlet entries. Each of the portlet entries includes metadata associated with the portlet. The metadata includes a variety of descriptive information associated with the portlet. Such information can include an identifier for the portlet, a description of the portlet, an access point for the portlet, a reference to the producer maintaining the portlet, and various arbitrary metadata. In some embodiments, the producer reference can be a ServiceKey object, which is a WSDL identifier for the portlet. In one embodiment, the registry is maintained as a Universal Description Discovery and Integration (UDDI) registry. The Universal Description, Discovery and Integration (UDDI) is a standardized format for representing registry information. For further information regarding UDDI, reference may be had to the OASIS UDDI Specification (http://www.uddi.org/specification.html). Registries in this format can be accessed as WSDL services and enable easier configuration of business processes.

The producer server publishes a set of portlets that are available to be utilized as remote portlets and provides this information to the registries. In some embodiments, the producer utilizes BusinessEntity and BusinessService objects to communicate this information to the registry. These objects are WDSL identifiers that provide information about an entity and the services that it provides.

In some embodiments, the producers do not utilize an external server, but rather generate their own internal registries that can be accessed by the consumer admin system 110.

The consumer admin system 110 is an administrative system that is used for configuring the consumer 115. In some embodiments, the admin system 110 resides within some or all of the other systems illustrated by FIG. 3. In some embodiments, the admin system 110 is used to provide all external configurations for the consumer. In other embodiments, the admin system 110 is used to configure remote portlets on the consumer.

The consumer admin system 110 can submit a search request to the registry server 300. The search request can include descriptive information for the portlets, identifiers, or any information that a searcher might employ when looking for a portlet. The registry server 300 matches this information against the metadata for portlets stored within the database and returns any matches. A user of the consumer admin system 110 can retrieve information for configuring the returned portlets as remote portlets by selecting the returned results.

Figure 4:
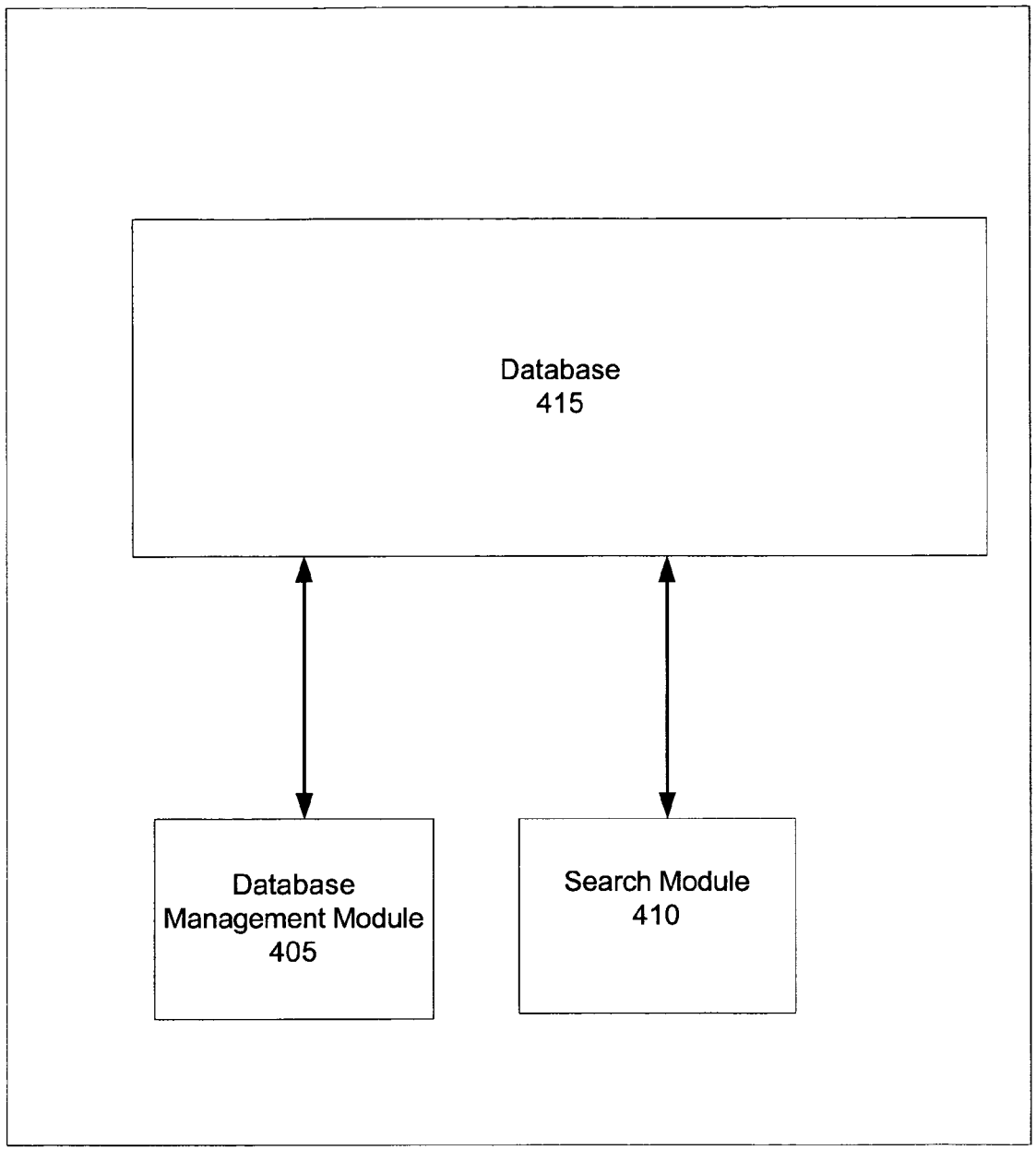
FIG. 4 illustrates another view of an example registry server in an embodiment.

FIG. 4 illustrates a closer view of an example registry server embodiment. The registry server shown in FIG. 4 includes a database 415, a database management module 405, and a search module 410. The database 415 stores portlet information for the registry server. The database management module 405 is responsible for generating the database 415 from received producer information. In some embodiments, the database management module 405 receives portlet information from the producer in the form of descriptive information and converts it to the format of the database 415, such as UDDI. In an alternate embodiment, the producer converts the portlet information to the registry server's internal format, before transmitting the portlet information to the registry server. While in the present embodiment, these components are shown as being located in a dedicated server, in alternate embodiments; they can be part of the producer 120.

The search module 410 enables searches of the database 415 by systems such as the consumer admin system 110. The search module 410 generates a user interface through which the consumer admin system 110 can submit search queries. The search queries can include descriptions of the portlets, names of the portlets, identifiers for the producers storing the portlets (e.g. identifier, WSDL ID, IP address, hostname) or any other search criteria. The search module 410 searches the database 415 against the search terms and returns any portlets having metadata matching the search terms. The search module 410 usually returns the metadata for the portlets, including configuration information for utilizing the portlets as remote portlets. This configuration information can include an identifier for the producer, an identifier for the portlet, and any other relevant information. In some embodiments, the search module includes a server for generating a web interface that accepts the search terms. In alternate embodiment, it interacts with an existing server.

Figure 5:
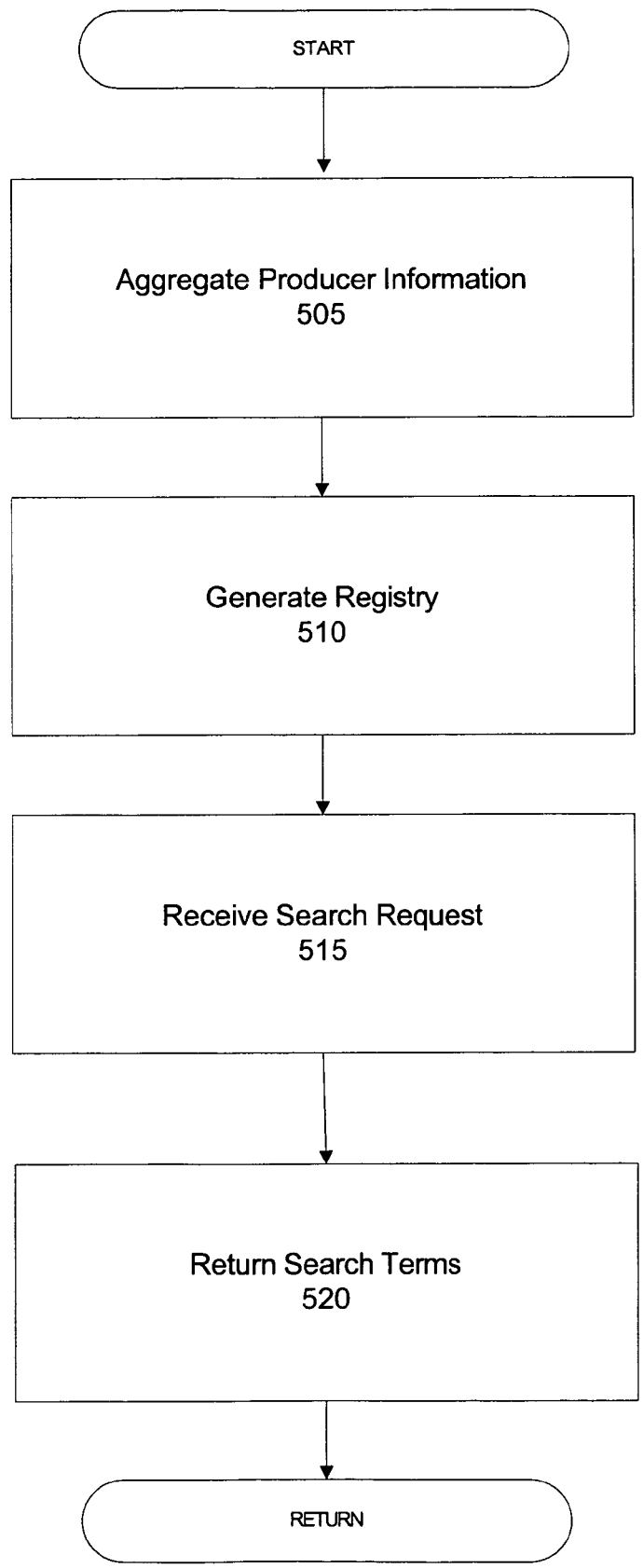
FIG. 5 is a flow chart illustrating an example process for generating and utilizing a registry in an embodiment.

FIG. 5 is a flow chart illustrating an example process for generating and utilizing a registry in an embodiment. In block (505), the registry server aggregates producer information. Aggregating producer information can include accepting portlet information from one or more producers. In some embodiments, the portlet information is converted to the internal format of the registry before being transferred by the producers. In alternate embodiments the registry server converts the portlet configuration information internally.

In block (510), the registry server builds the registry. Building the registry can include building a database containing one or more portlet entries with portlet metadata. These entries can be organized in a relational database. In one embodiment, the registry is organized as a UDDI database. Building the registry can also entail generating a search interface for accepting searches for portlets. The search interface can be a graphical user interface presented on a web page. Alternately, the search interface can be a data interface that accepts search terms and returns search results from a remote search application.

In block (515), the registry receives a search request from a remote system. In one embodiment, the remote system is the consumer admin system 110. The search request can include descriptions of the portlets, names of the portlets, identifiers for the producers storing the portlets (e.g. identifier, WSDL ID, IP address, hostname) or any other terms. The registry server searches its database 415 against the search terms.

In block (520) the registry server returns any portlets having metadata matching the search terms. The search can return the metadata for the portlets, including configuration information for utilizing the portlets as remote portlets. This configuration information can include an identifier for the producer, an identifier for the portlet, and any other relevant information. In some embodiments, the search module includes a server for generating a web interface that accepts the search terms. In alternate embodiment, it interacts with an existing server.

Figure 6:
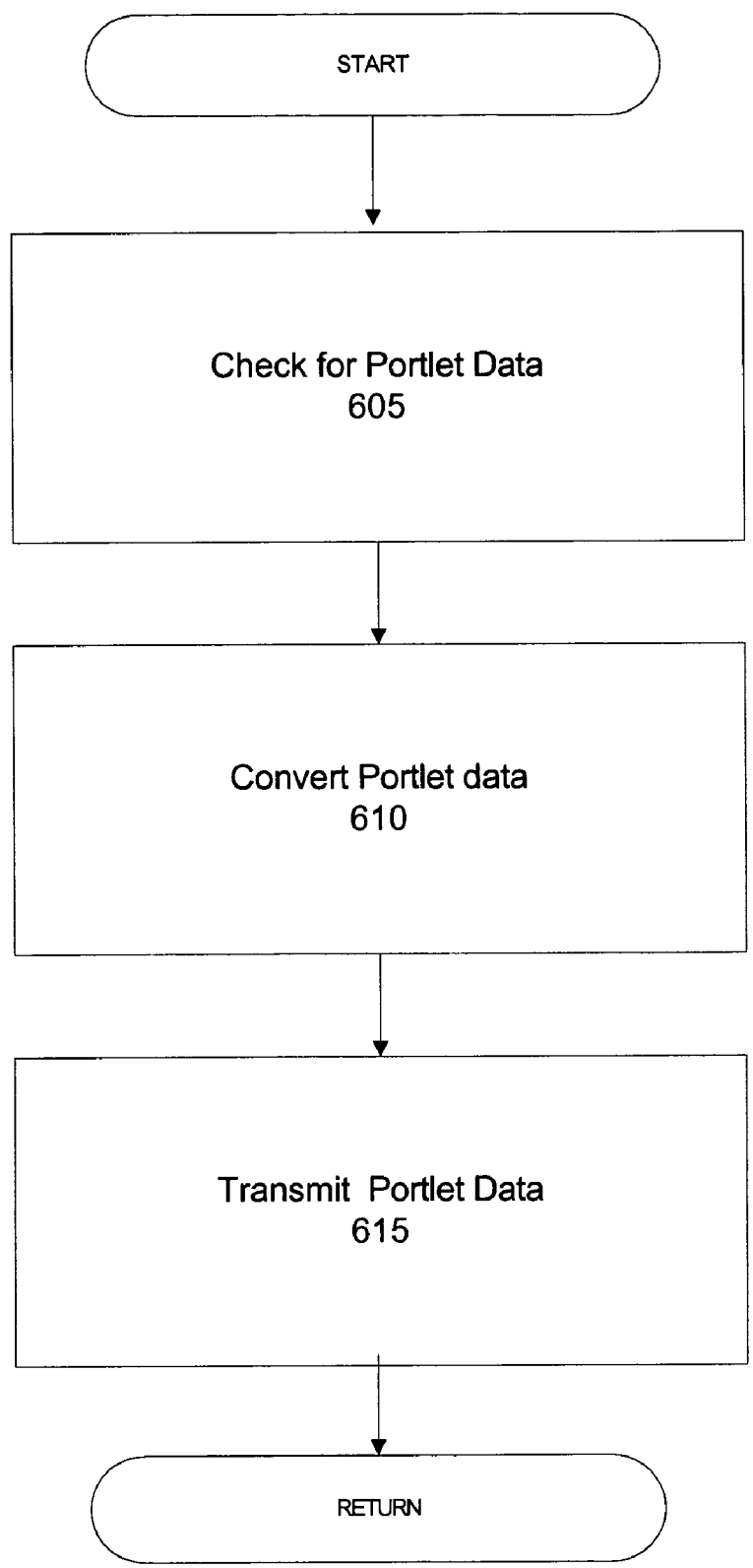
FIG. 6 is a flow chart illustrating an example process for configuring a producer to contribute to a registry in an embodiment.

FIG. 6 is a flow chart illustrating an example process for configuring a producer to contribute to a registry in an embodiment. This process can be used for contributing portlet information to an external registry server or for generating an internal registry for the producer. In block (605) the producer checks for portlet information. The producer can maintain a listing of portlet files that store information about each of the portlets or an internal portlet registry. In some embodiments, the portlets are checked as a result of a user request, in alternate embodiments, the producer 120 regularly checks for new portlets and automatically publishes the new portlets upon detection. In some embodiments, the producer periodically checks for changes to an internal portlet registry and submits an update to the portlet registry when new portlets are detected.

In block (610) the producer converts the portlet information into a format that can be used by the registry. In some embodiments, converting the portlet information can include generating a WSRP configuration for the producer and the portlets. The producer can convert the portlets to a format used by the registry, or simply maintain the existing configuration files. Typically the registry will use a web service access point for the portlet, which can be the portlet handle or some other arbitrary identifier, and is used in web service databases as a mechanism for locating a web service. Additionally, the registry information can include a web service identifier for the producer, and metadata identifying the portlets and enabling the portlets to be configured as remote portlets.

In block (615), the producer transmits the portlet information to the registry. If the registry is external, the producer can transmit the information to the external registry server. If the registry server is internal, the producer can generate its own mechanisms for publishing the portlet information. In the event that the registry information is published in UDDI format, the producer can generate a WSRP business service (a service that can be processed in web service databases and accessed using web service protocols and is used to identify the producer and its capacities). In some embodiments the registry is not available and the producer waits a predetermined period of time before contacting the registry again.

The following configuration files can be used to represent the producer registry as a WSRP business service and be used to identify the producer (wsrp_service_tModel.xml) and its WSDL (wsrp_v1_bindings_tmodel.xml) within the portlet registry entries.

--- wsrp_v1_bindings_tModel.xml

---

```
<?xml version="1.0" encoding="UTF-8" ?>
<SOAP-ENV:Envelope xmlns:SOAP-ENV="http://schemas.xmlsoap.org/soap/envelope/">
    <SOAP-ENV:Body>
        <Taxonomy checked="false" type="tModel" xmlns="urn:uddi-org:api_v2">
            <applicability>
                <scope>businessEntity</scope>
                <scope>businessService</scope>
                <scope>bindingTemplate</scope>
            </applicability>
            <!-- This tModel specifies the fingerprint of a WSRP service. -->
            <tModel tModelKey="uuid:C1ACF26D-9672-4404-9D70-39B756E6EEEE">
                <name>urn:oasis:names:tc:wsrp:tmodel:wsrp_service_type</name>
                <description>Specifies the fingerprint of a WSRP service.</description>
                <overviewDoc>
                    <overviewURL>http://www.oasis-open.org/committees/wsrp/specifications/UDDI_NOTE.doc</overviewURL>
                </overviewDoc>
                <categoryBag>
                    <keyedReference   tModelKey="uuid:c1acf26d-9672-4404-9d70-39b756e62ab4" keyValue="unchecked"/>
                    <keyedReference   tModelKey="uuid:c1acf26d-9672-4404-9d70-39b756e62ab4" keyValue="categorization"/>
                </categoryBag>
            </tModel>
            <categories>
                <category keyName="uddi-org:types" keyValue="tModel"/>
            </categories>
        </Taxonomy>
    </SOAP-ENV:Body>
</SOAP-ENV:Envelope>
<?xml version="1.0" encoding="UTF-8" ?>
<SOAP-ENV:Envelope xmlns:SOAP-ENV="http://schemas.xmlsoap.org/soap/envelope/">
    <SOAP-ENV:Body>
        <Taxonomy checked="false" type="wsdlSpec" xmlns="urn:uddi-org:api_v2">
            <applicability>
                <scope>businessEntity</scope>
                <scope>businessService</scope>
                <scope>bindingTemplate</scope>
            </applicability>
            <!-- This tModel represents the technical fingerprint of WSRP protocol -->
```

-continued wsrp_v1_bindings_tModel.xml

```
        <tModel tModelKey="uuid:C1ACF26D-9672-4404-9D70-39B756E6FFFF">
            <name>urn:oasis:names:tc:wsrp:tmodel:wsrp_v1_bindings</name>
            <description>This tModel specifies a WSRP Producer WSDL.</description>
            <overviewDoc>
                <overviewURL>http://www.oasis-open.org/committees/wsrp/specifications/version1/wsrp_v1_bindings.wsdl</overviewURL>
            </overviewDoc>
            <categoryBag>
                <keyedReference    tModelKey="uuid:c1acf26d-9672-4404-9d70-39b756e62ab4" keyName="uddi-org:types" keyValue="unchecked"/>
            </categoryBag>
        </tModel>
        <categories>
            <category keyName="uddi-org:types" keyValue="wsdlSpec"/>
        </categories>
    </Taxonomy>
  </SOAP-ENV:Body>
</SOAP-ENV:Envelope>
```

The portlets can be set up and represented as web service entries that are accessible from the UDDI registry generated by the producer. Doing so involves the generation of an XML document defining the web service identity for any portlets (wsrp_portlet_tmodel.xml) and the web service relationship between portlets and the producer (wsrp_producer_ref-tmodel.xml) as indicated in the documents below.

wsrp_portlet_tModel.xml

```
?xml version="1.0" encoding="UTF-8" ?>
<SOAP-ENV:Envelope xmlns:SOAP-ENV="http://schemas.xmlsoap.org/soap/envelope/">
    <SOAP-ENV:Body>
        <Taxonomy checked="false" type="tModel" xmlns="urn:uddi-org:api_v2">
            <applicability>
                <scope>businessEntity</scope>
                <scope>businessService</scope>
                <scope>bindingTemplate</scope>
            </applicability>
            <!-- This is a tModel for Portlets. The tModel key is arbitrary, and should be updated
                 with the official version. The overviewURL must also be updated once the tech note if
                 final. -->
            <tModel tModelKey="uuid:C1ACF26D-9672-4404-9D70-39B756E6DDDD">
                <name>urn:oasis:names:tc:wsrp:tmodel:wsrp_portlet_handle</name>
                <description xml:lang="en">This tModel identifies portlets</description>
                <overviewDoc>
                    <overviewURL>http://www.oasis-open.org/committees/wsrp/specifications/UDDI_NOTE.doc</overviewURL>
                </overviewDoc>
                <categoryBag>
                    <keyedReference    tModelKey="uuid:c1acf26d-9672-4404-9d70-39b756e62ab4" keyValue="unchecked"/>
                    <keyedReference    tModelKey="uuid:c1acf26d-9672-4404-9d70-39b756e62ab4" keyValue="categorization"/>
                </categoryBag>
            </tModel>
            <categories>
                <category keyName="uddi-org:types " keyValue="tModel"/>
            </categories>
        </Taxonomy>
    </SOAP-ENV:Body>
</SOAP-ENV:Envelope>
```

| wsrp_producer_ref_tModel.xml |
|---|

```xml
<?xml version="1.0" encoding="UTF-8" ?>
<SOAP-ENV:Envelope xmlns:SOAP-ENV="http://schemas.xmlsoap.org/soap/envelope/">
    <SOAP-ENV:Body>
        <Taxonomy checked="false" type="tModel" xmlns="urn:uddi-org:api_v2">
            <applicability>
                <scope>businessEntity</scope>
                <scope>businessService</scope>
                <scope>bindingTemplate</scope>
            </applicability>
            <!-- This tModel specifies an association between a portlet and the offering producer. -->
            <tModel tModelKey="uuid:C1ACF26D-9672-4404-9D70-39B756E6CCCC">
                <name>urn:oasis:names:tc:wsrp:tmodel:wsrp_producer_reference</name>
                <description>This tModel is a taxonomy tModel used to identify a relationship to a Producer?s businessService UDDI entity</description>
                <overviewDoc>
                    <overviewURL>http://www.oasis-open.org/committees/wsrp/specifications/UDDI_NOTE.doc</overviewURL>
                </overviewDoc>
                <categoryBag>
                    <keyedReference    tModelKey="uuid:c1acf26d-9672-4404-9d70-39b756e62ab4" keyValue="unchecked"/>
                    <keyedReference    tModelKey="uuid:c1acf26d-9672-4404-9d70-39b756e62ab4" keyValue="categorization"/>
                </categoryBag>
            </tModel>
            <categories>
                <category keyName="uddi-org:types" keyValue="tModel"/>
            </categories>
        </Taxonomy>
    </SOAP-ENV:Body>
</SOAP-ENV:Envelope>
```

Furthermore, to generate an internal registry, configuration information for the registry can be provided in a main configuration file for the producer. This information can include Uniform Resource Locators (URLs) for portlet publication calls and portlet search requests and credential information for publishing. Below is one example of configuration information that can be stored in a config.xml file for a producer.

a local registry, including the generation of a search interface and returning search results for the WSRP portlets.

Figure 7:
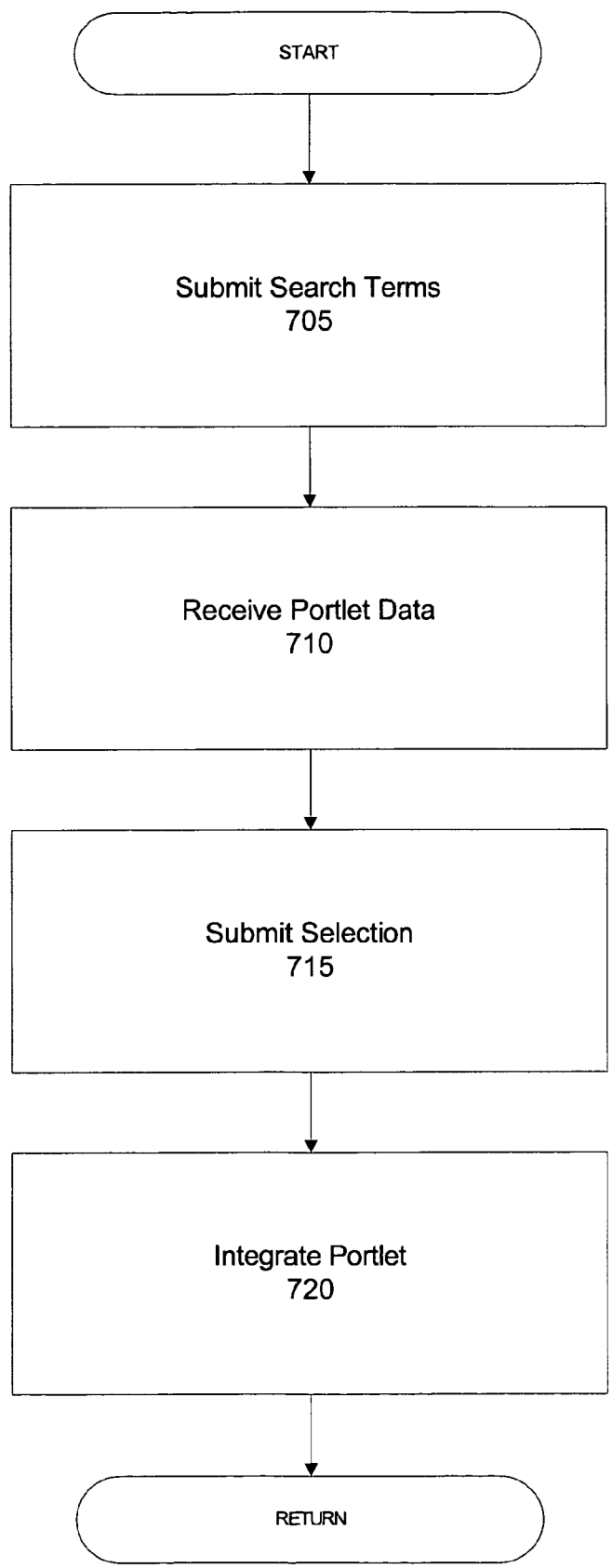
FIG. 7 is a flow chart illustrating an example process for configuring a consumer to utilize information stored in a registry in an embodiment.

FIG. 7 is a flow chart illustrating a example process for configuring a consumer to utilize information stored in a registry in an embodiment. In block (705) the portlet admin server submits a search request to the registry server. The search request can include descriptions of the portlets, names

```xml
<publish-target>
 <inquiry-url>http://localhost:7001/uddi/uddilistener</inquiry-url>
 <publish-url>http://localhost:7001/uddi/uddilistener</publish-url>
 <auth>
  <user-id>weblogic</user-id>
  <credential>weblogic</credential>
 </auth>
 <business-entity businessKey=" "
         authorizedName="weblogic" operator="BEA WebLogic Portal">
  <uddi:name xml:lang="en-US">WebLogic Portal Portlet Producer</uddi:name>
  <uddi:discoveryURLs>
     <uddi:discoveryURL useType="Web">http://localhost:7001</uddi:discoveryURL>
  </uddi:discoveryURLs>
  <uddi:contacts>
    <uddi:contact useType="admin">
      <uddi:description>Admin contact address</uddi:description>
      <uddi:email>admin@portal.com</uddi:email>
      <uddi:personName>Joe Admin</uddi:personName>
      <uddi:phone>555-555-5555</uddi:phone>
    </uddi:contact>
  </uddi:contacts>
 </business-entity>
 <producer-service-info>
  <name>WebLogic Portal Portlet Producer Service</name>
  <description>WebLogic Portal Portlet Producer Service</description>
  <wsdl-url>http://localhost:7001/simpleProducer/producer?WSDL</wsdl-url>
 </producer-service-info>
</publish-target>
```

If the producer is publishing to a local registry, the producer can then perform the steps described in FIG. 5 for generating of the portlets, identifiers for the producers storing the portlets (e.g. identifier, WSDL ID, IP address, hostname) or any other criteria.

In block (710), if the search terms match portlets stored in the registry, the consumer admin system receives portlet information. This information can be presented as a text or graphical listings of matching portlets. In block (715), the consumer admin system submits a selection of a portlet. This selection can be made through a graphical interface, text interface, voice interface, another form of interface, or any combination of the above. In block (720), the selection of the portlet causes the registry server to automatically provide WSRP configuration information to the consumer, which then utilizes the portlet as a remote portlet. In alternate embodiments, the processing of block (720) is not performed and a user of the consumer admin system can manually input the configuration information to the consumer.

Figure 8:
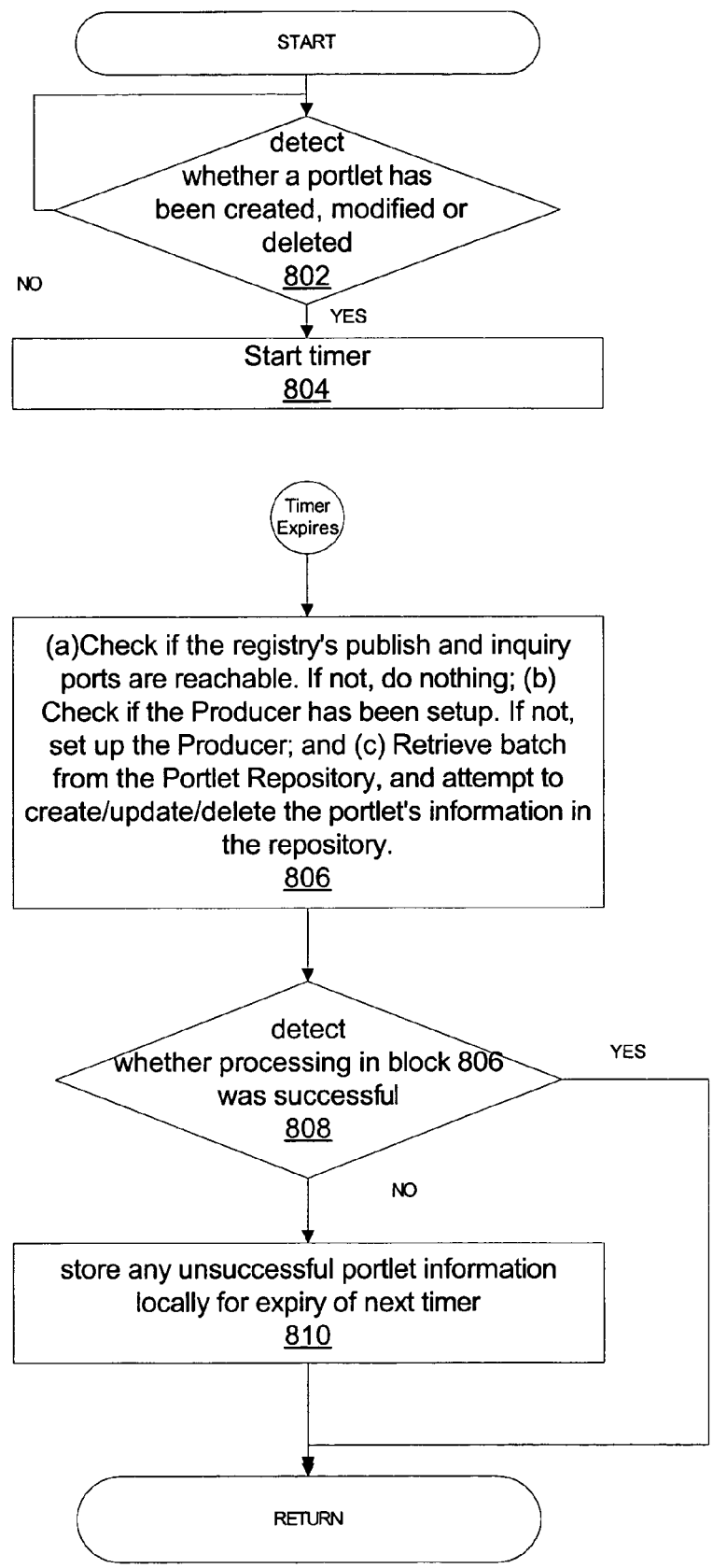
FIG. 8 illustrates an example process for updating a registry in an embodiment.

FIG. 8 illustrates one embodiment of an example process for updating a registry in response to changes in internal portlet availability in an embodiment. In an embodiment, a Producer synchronizes portlets to the registry as portlets are created, modified or deleted using processing such as that illustrated by the flowchart of FIG. 8. Note that such processing can enable the Producer to make a web services call to a remote registry for synchronizing portlets to the registry. In block (802), the PortletRegistry detects that a portlet has been created, modified or deleted and undertakes processing to maintain the set of portlets in a batch.

In block (804), the Producer deploys a ServletContextListener that starts a Timer when the context is initialized. In block (806), when a Timer callback is received, the Producer does the following processing: (a) Check to see if the registry's publish and inquiry ports are reachable. If not, do nothing; (b) Check to see if the Producer's BusinessEntity and BusinessService have been setup. If not, create the Producer's BusinessEntity and BusinessService; and (c) Get the batch from the PortletRepository, and try to create/update/delete portlet BusinessServices. In block (808) a test is performed to determine if the processing of block 806 has failed. If a failure is detected, then in block (810) the remaining batch is stored locally. The Producer will attempt to synchronize the failed portlets on the next Timer callback in block (806). Otherwise, if no failure is detected, processing continues with block (806).

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for publishing to a registry of portlets, the method comprising:

maintaining a plurality of producers, each producer having a service description handler responsible for providing a listing of portlets residing locally on that producer, and publication information associated with one or more portlets residing on that producer, wherein each producer is stored on a hardware computer readable storage medium;

initiating a timer for periodically determining a change in the listing of portlet files by checking a status check function for each portlet in the listing of portlet files, said status check function indicating that one of the one or more portlets on one of the plurality of producers has been modified, deleted, or that a portlet has been created;

detecting when the timer expires by the service description handler on each producer, the change in the listing of portlets;

updating, for each producer, the listing of portlets to include the change in the listing of portlets;

synchronizing the listing of portlets for each producer to a registry server, wherein the registry server includes the publication information for the listing of portlets, said publication information including a web service identifier that associates each of the one or more portlets to a particular producer;

determining whether a failure occurred during synchronizing of the change in the listing of portlet files, wherein if it is determined the failure occurred, publication information for any portlets not successfully synchronized is stored locally for processing during subsequent synchronization of the listing of portlet files;

publishing the registry server as a web service, said web service accessible via protocols that enable the registry server to be accessed by remote consumers, wherein each remote consumer has a registration value;

searching the registry server for the one or more portlets that are located across the plurality of producers using search criteria based on the publication information associated with each one of the portlets, wherein searching the registry server includes receiving a service description request at the registry server requesting a particular portlet from one of the remote consumers, the particular portlet available at one of the plurality of producers;

determining, by the producer having the particular portlet, whether the particular portlet is capable of being utilized remotely by the one of the remote consumers requesting the particular portlet, wherein determining includes comparing the registration value of the one of the remote consumers with the web service identifier of the particular portlet;

receiving, in response to the service description request, the particular portlet when it is determined that the particular portlet is capable of being utilized remotely; and wherein the method is performed by one or more processors.

2. The method of claim 1, wherein the step of checking the set of portlet files on the producer comprises:
periodically checking the availability of the portlets using a status check function.

3. The method of claim 1, wherein the step of synchronizing the listing of portlets comprises:
synchronizing the publication information to the registry server from the plurality of producers.

4. The method of claim 1, wherein the step of synchronizing the listing of portlets enables:
maintaining portlets from the plurality of producers using the registry of portlets.

5. The method of claim 1, further comprising providing the registry of portlets to applications or users seeking to access a portlet.

6. The method of claim 5, thereby enabling the application or user to search in the registry of portlets for the portlet substantially independent of which web portal the application or user is associated.

7. The method of claim 1, further comprising synchronizing the registry of portlets.

8. The method of claim 1 wherein the identifying information associated with each one of the portlets in the listing of portlet files on the producer includes an identifier for the portlet, a description of the portlet and an access point for the portlet.

9. A non-transitory computer readable storage medium carrying one or more sequences of instructions for publishing to registry of portlets, which instructions when executed cause a system to carry out the steps of:
maintaining a plurality of producers, each producer having a service description handler responsible for providing a listing of portlets residing locally on that producer, and publication information associated with one or more portlets residing on that producer, wherein each producer is stored on a hardware computer readable storage medium;

initiating a timer for periodically determining a change in the listing of portlet files by checking a status check function for each portlet in the listing of portlet files, said status check function indicating that one of the one or more portlets on one of the plurality of producers has been modified, deleted, or that a portlet has been created;

detecting when the timer expires by the service description handler on each producer, the change in the listing of portlets;

updating, for each producer, the listing of portlets to include the change in the listing of portlets;

synchronizing the listing of portlets for each producer to a registry server, wherein the registry server includes the publication information for the listing of portlets, said publication information including a web service identifier that associates each of the one or more portlets to a particular producer;

determining whether a failure occurred during synchronizing of the change in the listing of portlet files, wherein if it is determined the failure occurred, publication information for any portlets not successfully synchronized is stored locally for processing during subsequent synchronization of the listing of portlet files;

publishing the registry server as a web service, said web service accessible via protocols that enable the registry server to be accessed by remote consumers, wherein each remote consumer has a registration value;

searching the registry server for the one or more portlets that are located across the plurality of producers using search criteria based on the publication information associated with each one of the portlets, wherein searching the registry server includes receiving a service description request at the registry server requesting a particular portlet from one of the remote consumers, the particular portlet available at one of the plurality of producers;

determining, by the producer having the particular portlet, whether the particular portlet is capable of being utilized remotely by the one of the remote consumers requesting the particular portlet, wherein determining includes comparing the registration value of the one of the remote consumers with the web service identifier of the particular portlet; and receiving, in response to the service description request, the particular portlet when it is determined that the particular portlet is capable of being utilized remotely.

10. The non-transitory computer readable storage medium of claim 9, including instructions for carrying out the step of:
periodically checking the availability of the portlets using a status check function.

11. The non-transitory computer readable storage medium of claim 9, wherein the instructions for carrying out the step synchronizing the listing of portlets includes instructions for carrying out the step of:
synchronizing the publication information to the registry server from the plurality of producers.

12. The non-transitory computer readable storage medium of claim 9, wherein processing of the instructions for carrying out the step of synchronizing the listing of portlets enables:
portlets from the plurality of producers to be maintained using the registry of portlets.

13. The non-transitory computer readable storage medium of claim 9, further comprising instructions for carrying out the step of:
providing the registry of portlets to applications or users seeking to access a portlet.

14. The non-transitory computer readable storage medium of claim 13, the processing of the recited instructions enabling the application or user to search in the registry of portlets for the portlet substantially independent of which web portal the application or user is associated.

15. The non-transitory computer readable storage medium of claim 9, further comprising instructions for carrying out the step of:

synchronizing the registry of portlets.

16. An apparatus for publishing to a portlet registry, the apparatus comprising:

A hardware processor; and one or more stored sequences of instructions which, when executed by the processor, cause the processor to carry out the steps of:

maintaining a plurality of producers, each producer having a service description handler responsible for providing a listing of portlets residing locally on that producer, and publication information associated with one or more portlets residing on that producer, wherein each producer is stored on a computer readable storage medium;

initiating a timer for periodically determining a change in the listing of portlet files by checking a status check function for each portlet in the listing of portlet files, said status check function indicating that one of the one or more portlets on one of the plurality of producers has been modified, deleted, or that a portlet has been created;

detecting when the timer expires by the service description handler on each producer, the change in the listing of portlets;

updating, for each producer, the listing of portlets to include the change in the listing of portlets;

synchronizing the listing of portlets for each producer to a registry server, wherein the registry server includes the publication information for the listing of portlets, said publication information including a web service identifier that associates each of the one or more portlets to a particular producer;

determining whether a failure occurred during synchronizing of the change in the listing of portlet files, wherein if it is determined the failure occurred, publication information for any portlets not successfully synchronized is stored locally for processing during subsequent synchronization of the listing of portlet files;

publishing the registry server as a web service, said web service accessible via protocols that enable the registry server to be accessed by remote consumers, wherein each remote consumer has a registration value;

searching the registry server for the one or more portlets that are located across the plurality of producers using search criteria based on the publication information associated with each one of the portlets, wherein searching the registry server includes receiving a service description request at the registry server requesting a particular portlet from one of the remote consumers, the particular portlet available at one of the plurality of producers;

determining, by the producer having the particular portlet, whether the particular portlet is capable of being utilized remotely by the one of the remote consumers requesting the particular portlet, wherein determining includes comparing the registration value of the one of the remote consumers with the web service identifier of the particular portlet; and receiving, in response to the service description request, the particular portlet when it is determined that the particular portlet is capable of being utilized remotely.

* * * * *

UNITED STATES PATENT AND TRADEMARK OFFICE
CERTIFICATE OF CORRECTION

PATENT NO. : 8,001,216 B2
APPLICATION NO. : 11/172253
DATED : August 16, 2011
INVENTOR(S) : Allamaraju Page 1 of 1

It is certified that error appears in the above-identified patent and that said Letters Patent is hereby corrected as shown below:

On cover page, in column 2, under "Other Publications", line 9, delete "form" and insert -- from --, therefor.

In the drawings: on sheet 3 of 8, in figure 3, below box 300, line 2, delete "Portet" and insert -- Portlet --, therefor.

In column 1, line 26, delete "11/172,253," and insert -- 11/172,253 --, therefor.

In column 5, line 61, after "in" delete "a".

In column 7, line 55, delete "WDSL" and insert -- WSDL --, therefor.

In column 19, line 7, in Claim 16, delete "A" and insert -- a --, therefor.

Signed and Sealed this
Twenty-ninth Day of November, 2011

David J. Kappos
*Director of the United States Patent and Trademark Office*